United States Patent [19]

Klebe et al.

[11] Patent Number: 4,503,092
[45] Date of Patent: Mar. 5, 1985

[54] PROCESS FOR THE HYDROPHOBIZATION OF PYROGENICALLY PRODUCED SILICA

[75] Inventors: Hans Klebe, Rheinfelden; Detlev Koth, Grenzach-Whylen; Dieter Kerner, Hanau; Josef Schmid, Rheinfelden; Manfred Schmid, Kandern, all of Fed. Rep. of Germany

[73] Assignee: Degussa Aktiengesellschaft, Frankfurt am Main, Fed. Rep. of Germany

[21] Appl. No.: 477,875

[22] Filed: Mar. 23, 1983

[30] Foreign Application Priority Data

Mar. 27, 1982 [DE] Fed. Rep. of Germany ....... 3211431

[51] Int. Cl.$^3$ ............................................. C01B 33/18
[52] U.S. Cl. .................................... 427/213; 423/335; 423/336; 423/337; 427/215; 427/255.4; 427/399

[58] Field of Search ....................... 423/336, 337, 335; 427/215, 213, 255.4, 399

[56] References Cited

U.S. PATENT DOCUMENTS 4,147,760  4/1979  Kratel ................................. 423/336

FOREIGN PATENT DOCUMENTS 1031764  6/1966  Fed. Rep. of Germany ...... 423/336

Primary Examiner—Jack Cooper
Attorney, Agent, or Firm—Cushman, Darby & Cushman

[57] ABSTRACT

Pyrogenically produced silica after separation of the hydrogen halide is mixed with nitrogen and conveyed into a cyclone. After separation of the gases, which are returned into the cooling stretch of the production apparatus, the silica is first mixed with organohalosilane and nitrogen and subsequently with steam and nitrogen. Subsequently the hydrophobization reaction is carried out in known manner in a fluidized bed reactor. The reaction waste gases are returned into the cyclone.

10 Claims, 1 Drawing Figure

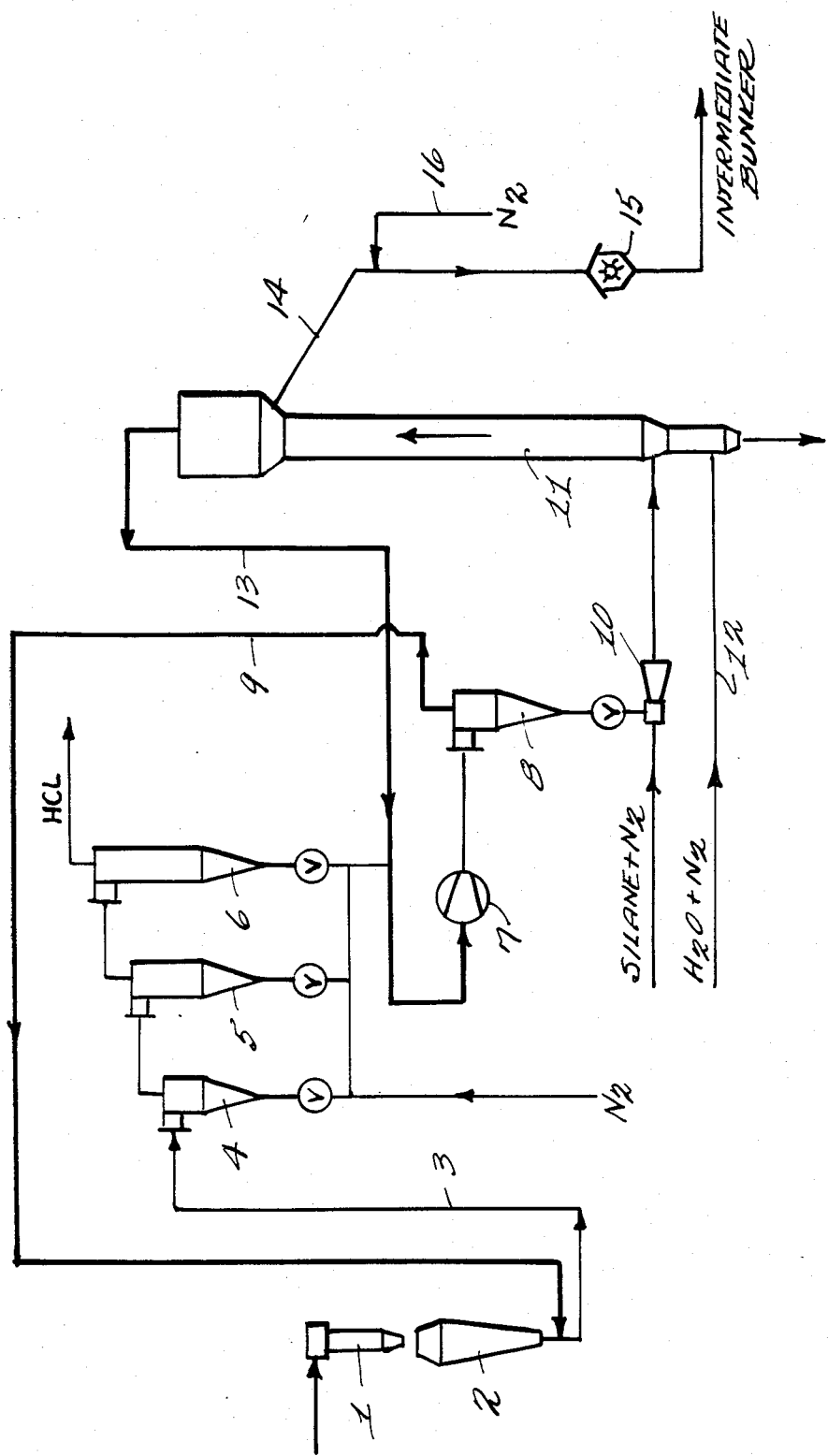

PROCESS FOR THE HYDROPHOBIZATION OF PYROGENICALLY PRODUCED SILICA

BACKGROUND OF THE INVENTION

The invention is directed to a process for the hydrophobization of pyrogenically produced silica, preferably in direct connection with the process of the production of pyrogenic silica from a silicon halide compound.

It is known according to German Pat. No. 1163784 to hydrophobize pyrogenically produced silica with dimethyldichlorosilane in a fluidized bed. The entire disclosure of the German patent is hereby incorporated by reference and relied upon.

The individual components according to the process scheme of this publication are mixed with each other in such manner that steam in admixture with nitrogen is mixed with the pryogenically produced silica. Subsequently this wet silica is supplied with a gaseous mixture consisting of dimethyldichlorosilane and nitrogen. The true hydrophobization reaction is carried out subsequently in a fluidized bed reactor.

This procedure has the disadvantage that because of the moisture content of the pyrogenically produced silica the pipelines of the hydrophobization apparatus are stopped up.

Furthermore, high loss of yields and undesired sideproducts occur through the partial reaction of the organohalosilane with the steam on the pryogenically produced silica before the hydrophobization reaction can be carried out under controlled conditions in the fluidized bed reactor.

A further disadvantage of the known process according to German Pat. No. 1163784 results from the specific composition of the waste gas of the hydrophobization reaction. It consists of hydrophobized pyrogenically produced silica, excess organohalosilane, hydrogen chloride, if for example, there is reacted dimethyldichlorosilane as the organohalosilane, nitrogen and steam.

Hydrophobic silica is led into the hydrogen chloride-absorption apparatus by means of the waste gas return described in the drawing of German Pat. No. 1163784. Through this there occurs an undesired formation of foam.

The waste gas lines are clogged up through polymerization reactions of the organohalosilane. Through this there occur disturbances in the plant such as pressure loss and fires.

In the experiment of working up this waste gas by means of water washing in a cooling tower there occurs a severe formation of foam. This foam is recirculated in the cooling tower whereby through the hydrophobic pyrogenically produced silica there is formed "dry water". It is not possible to filter off this foam because the filter is clogged up too quickly.

SUMMARY OF THE INVENTION

The subject matter of the invention is a process for the hydrophobization of pyrogenically produced silica from a silicon halide compound, as e.g. silicon chloride (e.g. silicon tetrachloride or trichlorosilane) or silicon tetrafluoride by means of an organohalosilane in a fluidized bed which is characterized by directly after the separation of the hydrogen halide in connection with the pyrogenic production the silica, in a given case, still carrying the reaction waste gases with it, is mixed with inert gas, preferably nitrogen, the silica is freed from the entrained gases by means of a separatory apparatus for example, a cyclone, these gases are introduced into the cooling zone of the production apparatus, the silica freed from the gases is mixed first with the organohalosilane and inert gas, preferably nitrogen, subsequently mixed with steam and inert gas, preferably nitrogen, subsequently the hydrophobization reaction carried out in known manner in a fluidized bed reactor and the waste gases of the hydrophobization reaction returned to the separatory apparatus, for example, a cyclone.

The hydrophobization reaction can be carried out at a temperature of 400° to 600° C., preferably from 500° to 600° C. Especially good deacidified hydrophobized silica is obtained at a temperature of 550° to 580° C. As hydrophobization agent then can be used known organohalosilanes. Preferably organochlorocompounds, especially dimethyldichlorosilane, are employed. Other illustrative organohalosilanes which can be used for example, are alkyl or aryl or mixed alkyl-aryl halosilanes and alkenyl halosilanes such as ethyl trichlorosilane, amyl trichlorosilanes, vinyl trichlorosilane, phenyl trichlorosilane, methyl trichlorosilane, methyl vinyl dichlorosilane, trimethyl chlorosilane, diphenyl dichlorosilane, bis-trichlorosilylethane, bis-trichlorosilyl benzene, dimethyl difluoromethane, trimethyl bromosilane.

In a preferred illustrative form of the invention the process of the invention is carried out in a connected system with the process for production of pyrogenic silica, whereby there can be used as the starting material silicon tetrachloride.

In an illustrative form of the invention the flow-through of the waste gases of the hydrophobization reaction can be controlled by means of automatic valves. These valves are preferably used in the form of butterfly valves. Through this means pressure surges are equalized and therewith constant reaction conditions and lower temperature variations are produced.

The hydrophobized silica can be discharged from the fluidized bed by means of a lock, preferably a bucket wheel lock. Through this there is prevented the oxygen entering the hydrophobization circuit and the forming of an explosive mixture with the organohalosilane.

The process of the invention has the advantage that it makes possible a substantially longer service life for the plant because there occur fewer cloggings of the lines. Since the side reactions are expressed, there is obtained a substantially homogeneous product.

The waste gas of the hydrophobization reaction is returned to the hydrophobization process through which there arise no losses in yield. Rather there is produced an increase in yield of about 3%. The sole byproduct in the use of the illustrative silicon tetrachloride as starting material for the production of silica and dimethyldichlorosilane as hydrophobization is only hydrogen chloride.

The expense of organohalosilane can be reduced because the unreacted organohalosilane is at least partially returned again into the hydrophobization process.

By mixing the pyrogenically produced silica with inert gas, as e.g. nitrogen, directly in connection with the process of production there is eliminated the danger of fire which exists through the mixing of organohalosilane and residual oxygen from the process of producing the silica.

The particular advantage is the fact that the hydrophobized silica is completely free from colorizing constituents.

BRIEF DESCRIPTION OF THE DRAWINGS

The single FIGURE of the drawings shows the process in diagrammatic form.

The process can comprise, consist essentially of, or consist of the stated steps with the recited materials.

DETAILED DESCRIPTION

Referring more specifically to the drawings there are reacted SiCl4, hydrogen and air in burner 1 to form silica, the reaction products which among others also contains residual oxygen were led from the burner 1 into the coagulation zone 2 and led from there into the cooling zone 3. From there the reaction products go into the cyclones 4, 5, and 6 where there is carried out the separation of the solid silica from the gaseous reaction products. The gaseous reaction product mixture, essentially hydrogen chloride, is led from cyclone 6 for further processing.

The solid, powdery silica is mixed with nitrogen and led from cyclones 4, 5, and 6 by means of the conveying apparatus (blower) 7 into the cyclone 8.

There takes place a renewed separation of the solid silica from entrained gases. The gases are carried back via line 9 into the cooling zone 3.

The solid silica is subsequently mixed in the injector 10 with dimethyldichlorosilane and nitrogen and supplied to the fluidized bed reactor 11.

There is supplied to the fluidized bed reactor 11 via the separate line 12 a mixture of steam and nitrogen. The hydrophobization reaction is carried out in the fluidized bed reactor.

The reaction waste gases, consisting of hydrophobized silica, dimethyldichlorosilane, hydrogen chloride, nitrogen and steam are returned via line 13 and introduced to the suction side line of the conveying apparatus 7.

The hydrophobized silica is carried out of the fluidized bed reactor by means of line 14 and led via the bucket wheel lock 15 into the intermediate bunker (i.e. intermediate storage).

To reduce the danger of fire thereby nitrogen is led via the line 16 into the discharge line 14.

The sole product which accumulates in addition to hydrophobic silica is hydrogen chloride at cyclone 6.

The entire disclosure of German priority application No. P3211431.1 is hereby incorporated by reference.

What is claimed is:

1. In a process for the hydrophobization by means of an organohalosilane, steam and inert gas in a fluidized bed reactor of a pyrogenically produced silica made from a silicon halide compound in a burner wherein the silica, hydrogen halide and waste gases produced in said pyrogenic production are cooled in a cooling zone and the hydrogen halide separated therefrom, the improvement comprising directly after the separation of the hydrogen halide formed in the pyrogenic production of the silica, adding an inert gas to the silica and entrained waste gases separating the silica from the entrained waste gases, leading the separated gases into said cooling zone, mixing the silica freed from said waste gases first with a gaseous mixture consisting of said organohalosilane and an inert gas, introducing the mixture of silica and said gaseous mixture into the fluidized bed reactor and introducing a mixture of steam and inert gas separately from said mixture of silica, organohalosilane and inert gas, into the fluidized bed reactor and mixing the mixture of steam and inert gas with the mixture of silica, organohalosilane and inert gas therein and then carrying out the hydrophobization reaction in the fluidized bed reactor and returning the waste gases of the hydrophobization reaction to the separatory apparatus used to separate the silica from the entrained waste gases.

2. A process according to claim 1 wherein the organohalosilane is dimethyldichlorosilane.

3. A process according to claim 2 wherein the silicon halide compound is a silicon chloride.

4. A process according to claim 3 wherein the silicon chloride is silicon tetrachloride.

5. A process according to claim 1, including the step of controlling the flow of the waste gases of the hydrophobization reaction by passing the waste gases through an automatic valve.

6. A process according to claim 5 comprising carrying the hydrophobized silica out of the fluidized bed reactor through a locking device.

7. A process according to claim 1 comprising carrying the hydrophobized silica out of the fluidized bed reactor through a locking device.

8. A process according to claim 1 wherein the hydrophobization is carried out at 400° to 600° C.

9. A process according to claim 8 wherein the hydrophobization is carried out at a temperature of 500° to 600° C.

10. A process according to claim 9 wherein the hydrophobization is carried out at 550° to 580° C.

* * * * *